United States Patent [19]

Eggmann et al.

[11] 4,309,144
[45] Jan. 5, 1982

[54] AXIAL THRUST BEARING

[75] Inventors: Jean Eggmann; Max Hartmann, both of Baden, Switzerland

[73] Assignee: BBC Brown, Boveri & Company, Ltd., Baden, Switzerland

[21] Appl. No.: 63,693

[22] Filed: Aug. 10, 1979

[30] Foreign Application Priority Data

Aug. 4, 1978 [CH] Switzerland .................. 8333/78

[51] Int. Cl.³ .............................................. F01D 3/04
[52] U.S. Cl. .................................... 415/105; 415/107
[58] Field of Search ................... 415/104, 105, 107, 14

[56] References Cited

U.S. PATENT DOCUMENTS

| 1,593,031 | 7/1926 | Darson et al. | 415/104 |
| 1,895,003 | 1/1933 | Meyer | 415/107 |
| 3,220,244 | 11/1965 | Donnelly | 415/14 |
| 3,717,418 | 2/1973 | Pilarczyk | 415/104 |

FOREIGN PATENT DOCUMENTS

| 7558 | of 1914 | United Kingdom | 415/14 |
| 374739 | 6/1932 | United Kingdom | 415/104 |

Primary Examiner—William L. Freeh
Attorney, Agent, or Firm—Burns, Doane, Swecker & Mathis

[57] ABSTRACT

A method and apparatus for counteracting an axial thrust imparted to a shaft of a fluid turbine is disclosed. The apparatus includes first and second shaft thrust plates affixed to the shaft. A first, stationary axial thrust bearing engages the first shaft thrust plate. A second axial thrust bearing, having components which are axially movable, engages the second shaft thrust plate. The apparatus also includes a system of fluid lines for supplying pressurized fluid to bellows-like thrust chambers in the second axial thrust bearing. The source of the pressurized fluid is fluid compressed by a compressor mounted on the shaft.

3 Claims, 2 Drawing Figures

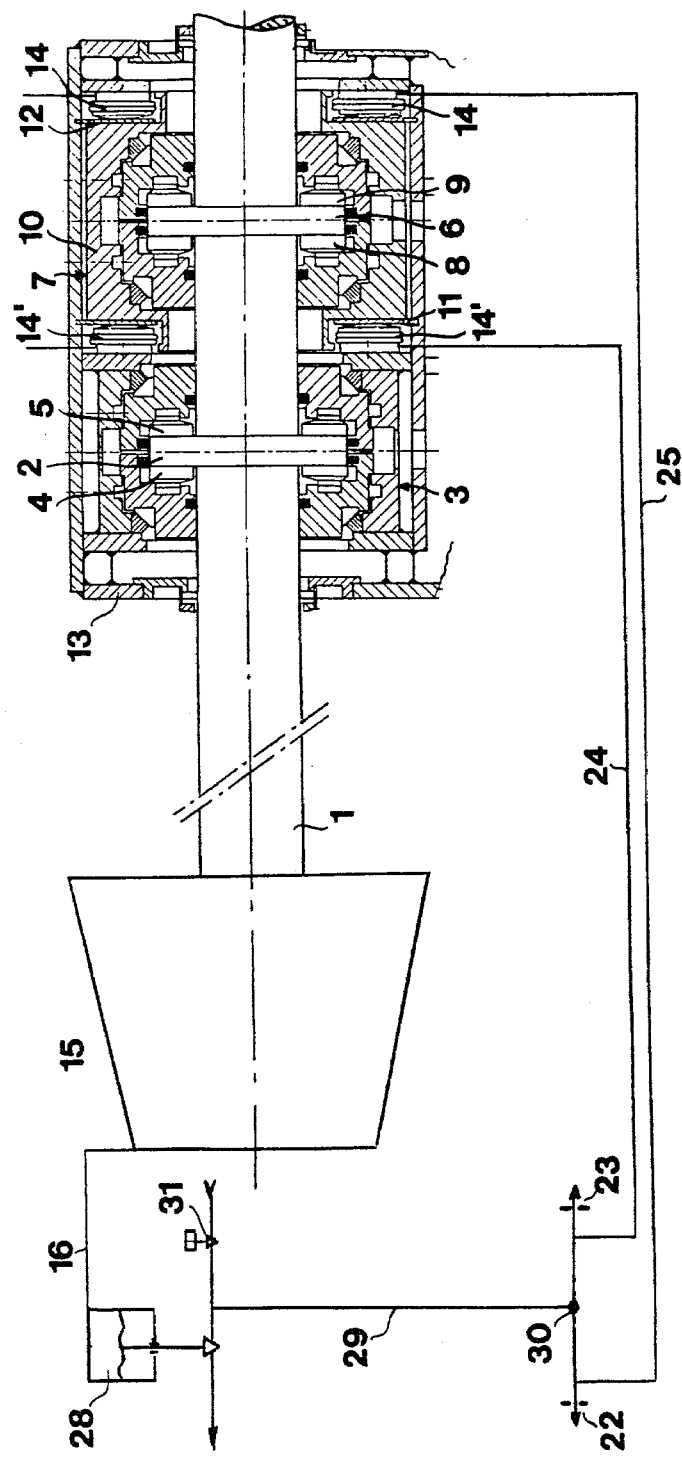

AXIAL THRUST BEARING

BACKGROUND AND SUMMARY OF THE PRESENT INVENTION

The invention disclosed herein pertains generally to axial thrust bearings, and more particularly to axial thrust bearings which can absorb the axial thrust exerted on a rotating shaft of a turbomachine.

In the turbomachinery art, it is known to absorb the axial thrust exerted on a turbine shaft with a stationary, rigidly positioned thrust bearing which interacts with a shaft thrust plate. However, in order to maintain the thrust bearing in good operating condition, the peripheral speed of the shaft thrust plate should not exceed a certain value. That is, the variation of the magnitude of the axial thrust which can be absorbed by a single thrust bearing is narrowly circumscribed. On the other hand, it is often not possible, particularly in the case of gas turbines, to accurately predict the axial thrust occurring in operation. Thus, there is a relatively large uncertainty factor with respect to the load on the thrust bearing, especially in the case of large gas turbines having shafts of necessarily large diameter. Increasing the size of the thrust bearing, in order to take account of this uncertainty factor, is possible but only if the peripheral speed of the shaft thrust plate were to be increased beyond desirable limits.

The use of two thrust bearings would appear to be a solution to the problem described above. But the use of two rigidly positioned prior art thrust bearings, one arranged behind the other, is not possible because of longitudinal thermal expansions arising during operation, i.e. thermal expansions parallel to the shaft axis.

Accordingly, a primary object of the present invention is to provide a method and apparatus for precisely counterbalancing the axial thrust imparted to a shaft, even in the case of the very large diameter shafts of very large gas turbines.

A further object of the present invention is to provide a method and apparatus for counterbalancing the axial thrust imparted to a shaft, whereby the counterbalancing effect may be regulated according to the magnitude and direction of the axial thrust.

Yet a further object of the present invention is to provide a method and apparatus whereby two or more axial thrust bearings may be used to absorb and counterbalance the axial thrust imparted to a shaft.

Apparatus for absorbing and counterbalancing the axial thrust imparted to a shaft of a turbomachine, according to the present invention, includes at least two segmental thrust bearings arranged one behind the other in a stationary housing. The first thrust bearing includes bearing elements which are axially stationary and which interact with a first shaft thrust plate affixed to the shaft. The second thrust bearing includes bearing elements which interact with a second shaft thrust plate affixed to the shaft, and which bearing elements are axially movable relative to the first shaft thrust plate. A pressure tap from a compressor of the turbomachine leads to two regulatable throttle valves each of which is connected to a chamber or a line. Each of these chambers or lines has an outlet orifice leading to the atmosphere. The pressure in each of the chambers or lines is transmitted to bellows-like thrust chambers which interact with the bearing elements of the second thrust bearing to counteract the axial thrust imparted to the shaft.

A second embodiment of the present invention includes a compressor pressure tap leading to an oil filled reservoir. The oil pressure in a line emanating from the oil filled reservoir is regulated by a throttle valve. This oil pressure may be transmitted to one of two bellows-like thrust chambers through two additional oil lines. These bellows-like thrust chambers also interact with the movable bearing elements of a second thrust bearing arranged behind a first stationary thrust bearing.

The apparatus described above may be used for example to absorb the axial thrusts imparted to the shafts of water turbines, gas turbines, steam turbines or compressors.

The above apparatus is advantageous because the axial thrust acting on a shaft can be distributed over any desired number of thrust bearings. In addition, the load-carrying capacity of this apparatus increases as the load it must bear increases, i.e., as the rotational speed of the shaft increases.

The above apparatus is also advantageous because it permits a feedback controlled thrust compensation. That is, the thrust compensation increases as the pressure of the working medium increases, which pressure increases as the axial thrust increases.

BRIEF DESCRIPTION OF THE DRAWINGS

Preferred embodiments of the present invention are described with reference to the accompanying drawings wherein like members bear like reference numerals, and wherein:

FIG. 2 is a diagrammatic view, partially in cross-section, of a second embodiment of apparatus for counteracting the axial thrust on a shaft of a gas turbine, according to the present invention, wherein the cross-sectional view of the axial thrust bearings is also greatly enlarged relative to the view of the compressor.

DETAILED DESCRIPTION OF THE PREFERRED EMBODIMENTS

Figure 1:
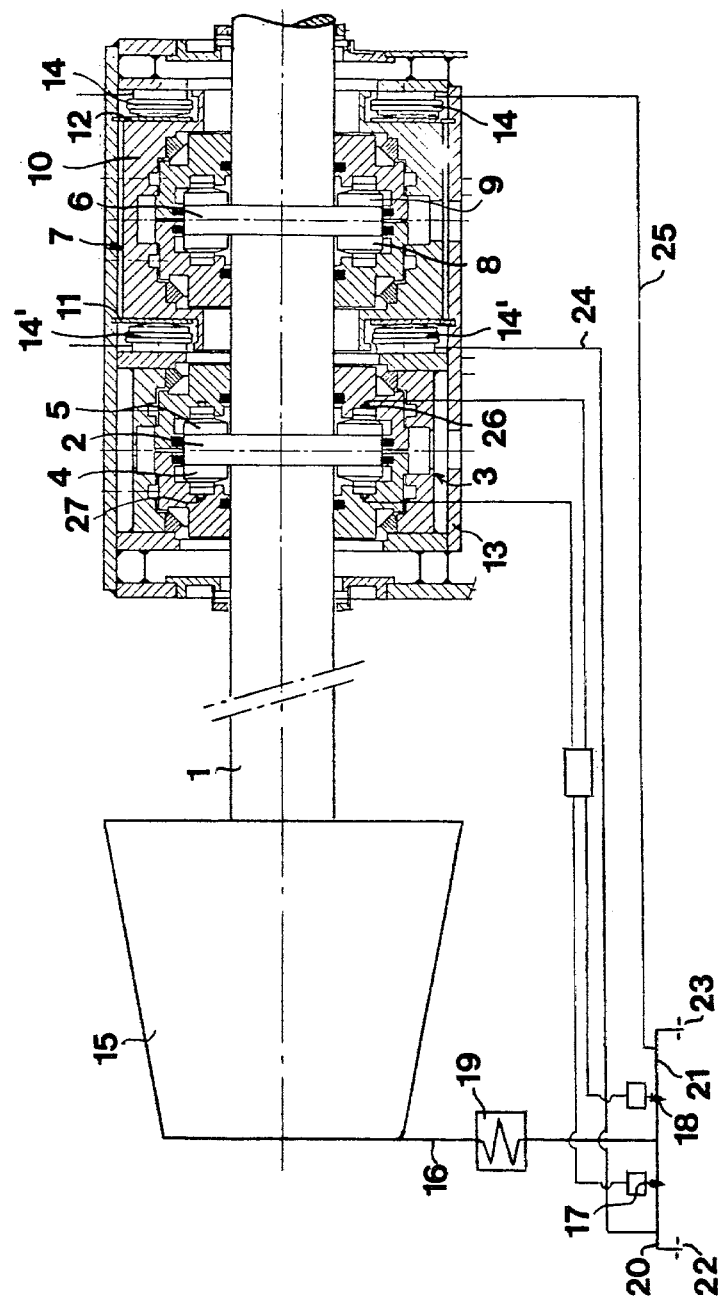
FIG. 1 is a diagrammatic view, partially in cross-section, of a first embodiment of apparatus for counteracting the axial thrust on a shaft of a gas turbine, according to the present invention, wherein the cross-sectional view of the axial thrust bearings is greatly enlarged relative to the view of the compressor.

With reference to FIG. 1, apparatus for absorbing and counteracting the axial thrust imparted to the shaft of a gas turbine, according to the present invention, includes a segmental thrust bearing 3. This thrust bearing, which is of known construction, is arranged within a stationary bearing housing 13, and is rigidly positioned with respect to a gas turbine shaft 1, i.e., is axially stationary with respect to the shaft 1. This thrust bearing, which is provided with two segmental rings 4 and 5, interacts with a first shaft thrust plate 2 mounted on the shaft 1.

A second segmental thrust bearing 7 is also arranged within the stationary bearing housing 13, behind the first thrust bearing 3. The second thrust bearing 7 interacts with a second shaft thrust plate 6 also mounted on the shaft 1. The second thrust bearing 7 includes two segmental bearing rings 8 and 9 which are axially movable relative to the first shaft thrust plate 2 of the first thrust bearing 3.

The two segmental bearing rings 8 and 9 of the second thrust bearing 7 are movable in common in the axial direction. The two bearing rings 8 and 9 are supported by a common holder ring 10 so that the spacing between these two segmental bearing rings is always accurately maintained. In order that the two segmental bearing rings 8 and 9, as well as the holder ring 10 holding them, be movable in the axial direction, the holder ring 10 is supported by two diaphragms 11 and 12. These diaphragms are elastic in the axial direction and are fixed on their outer peripheries to the stationary bearing housing 13.

Two thrust chambers 14 and 14', which are flexible in the axial thrust direction, are arranged within, and connected to, the bearing housing 13. Each of these thrust chambers, which includes a metal bellows, is in contact with one of two opposed end faces of the holder ring 10.

A compressor 15 is mounted on the gas turbine shaft 1. A pressure tap, which senses the pressure of the air compressed by the compressor 15, is connected by a line 16 to two individually controllable throttle valves 17 and 18. A cooler 19, which encircles the line 16, cools the air in the line 16. The cooler 19 tends to reduce the risk of fire associated with leaks of lubricating oil from the thrust chambers 14 and 14'. In the absence of cooler 19 otherwise hot air in the line 16, bled from the compressor 15, might ignite lubricating oil leaking from the thrust chambers 14 and 14'.

Line 16, which contains air bled from the compressor 15, leads to the throttle valves 17 and 18. The outlet side of each of the throttle valves 17 and 18 is connected to a chamber or line 20 and 21, respectively. These chambers or lines 20 and 21 have outlet orifices 22 and 23, respectively, which lead to the open atmosphere and which permit a small gas flow from the pressure tap through the particular open throttle valve. The outlet orifices 22 and 23 have such small orifice cross-sections that the pressure in either of the chambers or lines 20 or 21 can be controlled, and set to a level above atmospheric pressure, by adjusting the corresponding throttle valve 17 or 18. The pressure in the chamber or line 20 is transmitted by a line 24 into an interior of the thrust chamber 14'. Similarly the pressure in the chamber or line 21 is transmitted by a line 25 into an interior of the thrust chamber 14.

Depending on which of the two throttle valves 17 or 18 is open, the thrust compensation takes place in one of two axial directions parallel to the axis of the shaft 1. The magnitude of the thrust compensation is controlled by the amount by which one of the throttle valves is opened.

Pressure sensors 26 and 27 may be arranged in the axially stationary thrust bearing 3. The pressures sensed by these sensors may be communicated to the throttle valves 17 and 18. The extent of the opening of the throttle valves 17 and 18 can then be made a function of the pressures sensed by the pressure sensors 26 and 27.

By appropriately arranging the branch lines 20 and 21, condensed water which may have formed during the cooling of the compressed air in the cooler 19, is conveyed by the air flowing through the outlet orifice 22 or 23 into the atmosphere and not into the pressure lines 24, 25.

When the gas turbine is started up the two thrust bearings 3 and 7 can only be lightly loaded. Initially, only a light load can be borne by the bearings because the initial low rotational speed of the shaft 1 implies that the pressure of the air being compressed by the compressor 15 is relatively low. But the load on the bearings at this point in time is also relatively small. Because the pressure of the air in the line 16, which air is bled from compressor 15, increases as the axial thrust exerted by the turbine on the shaft 1 increases, the thrust compensation force exerted on the holder ring 10 by the thrust chamber 14 or 14' correspondingly increases.

During all operational modes of the turbine the two thrust bearings 3 and 7 are always subjected to substantially the same loading conditions. This is due to the axial displaceability of the second thrust bearing 7, which displaceability is independent of the particular operating temperature and the particular size of the individual bearing and turbine components.

Servo-motors with diaphragms may be used in place of thrust chambers 14 and 14'.

A second preferred embodiment of the present invention makes use of a pressurized oil system to actuate the thrust chambers 14 and 14'. With reference to FIG. 2 a line 16, which bleeds air from the compressor 15, leads to an oil reservoir 28. Oil from the reservoir 28 flows into an oil line 29. The oil pressure in the line 29 corresponds to an air pressure at the compressor 15. A three-way cock 30 makes it possible to switch the flow of oil from line 29 to either of lines 24 or 25 (in the same way that the air is supplied to lines 24 and 25 by the valves 17, 18 of FIG. 1), which lines lead to thrust chambers 14' and 14, respectively. As with the embodiment of the invention shown in FIG. 1, the ratio of the thrust compensation exerted by the thrust chamber 14 or 14' (depending on the direction of thrust), to the air pressure at the compressor 15, may be regulated by a throttle valve 31 placed near the outlet of reservoir 28 and connected to the line 29.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. An apparatus for absorbing an axial thrust exerted on a rotating shaft in a fluid-flow engine, the shaft being provided with a first thrust bearing which is located rigidly with respect to an axial direction of the shaft and which interacts with a first shaft thrust plate, said apparatus comprising:

at least a second shaft thrust plate;

at least a second thrust bearing which interacts with said second shaft thrust plate, said second thrust bearing including a first and a second bearing element, such that said bearing elements are displaceable in the axial direction relative to the first shaft thrust plate;

at least one thrust arrangement which counteracts the axial thrust on said bearing elements, said at least one thrust arrangement being controlled as a function of the axial thrust such that when the axial thrust changes, a thrust compensating force exerted by the at least one thrust arrangement varies accordingly; and wherein the fluid-flow engine is provided with a pressure tapping which is subject to the working medium and which is connected via a first line to at least one controllable throttle valve which throttle valve is connected on an outlet side via a second line to an outlet orifice, said outlet orifice leading into the open atmosphere and permitting a small flow of pressure medium from the pressure tapping through said at least one throttle valve, said outlet orifice having an orifice with a sufficiently small cross-section so that, in said second line connecting said outlet side of said at least one throttle valve to said outlet orifice, a super-atmospheric pressure can be set, said pressure being transmitted via a third line into an interior of said at least one thrust arrangement to provide a thrust compensation.

2. The apparatus of claim 1 wherein the at least one thrust arrangement includes at least one thrust chamber which is flexible in the direction of thrust.

3. The apparatus of claim 1 wherein said pressure tapping is provided on a compressor.

* * * * *